United States Patent
Chaki et al.

(10) Patent No.: US 7,835,483 B2
(45) Date of Patent: Nov. 16, 2010

(54) STEAM SEPARATOR, BOILING WATER REACTOR AND SWIRLER ASSEMBLY

(75) Inventors: Masao Chaki, Hitachi (JP); Michio Murase, Mito (JP); Naoyuki Ishida, Hitachi (JP)

(73) Assignee: Hitachi-GE Nuclear Energy, Ltd., Ibaraki-ken (JP)

( * ) Notice: Subject to any disclaimer, the term of this patent is extended or adjusted under 35 U.S.C. 154(b) by 185 days.

(21) Appl. No.: 11/679,948

(22) Filed: Feb. 28, 2007

(65) Prior Publication Data

US 2007/0201604 A1    Aug. 30, 2007

(30) Foreign Application Priority Data

Feb. 28, 2006   (JP) .............................. 2006-053713

(51) Int. Cl.
   *G21C 15/00*  (2006.01)
(52) U.S. Cl. ..................... 376/370; 376/371; 376/361
(58) Field of Classification Search ................. 376/370, 376/371, 361
See application file for complete search history.

(56) References Cited

U.S. PATENT DOCUMENTS

| | | | | |
|---|---|---|---|---|
| 1,478,660 A | * | 12/1923 | Barnes et al. ............... | 210/199 |
| 3,670,479 A | * | 6/1972 | Tomlinson .................... | 55/416 |
| 4,114,289 A | * | 9/1978 | Boulet ......................... | 34/173 |
| 4,289,611 A | * | 9/1981 | Brockmann ................. | 209/710 |
| 4,569,687 A | * | 2/1986 | Feng ........................... | 55/345 |
| 5,791,066 A | * | 8/1998 | Crews .......................... | 34/168 |
| 5,885,333 A | * | 3/1999 | Dix .............................. | 96/190 |
| 6,620,217 B2 | * | 9/2003 | Bruckmann et al. ........... | 55/347 |

FOREIGN PATENT DOCUMENTS

| JP | 2000-153118 | 6/2000 |
|---|---|---|
| JP | 2001-183489 | 7/2001 |

* cited by examiner

*Primary Examiner*—Rick Palabrica
(74) *Attorney, Agent, or Firm*—Antonelli, Terry, Stout & Kraus, LLP.

(57) ABSTRACT

A steam separator comprises an outer main swirler and an inner auxiliary swirler which is smaller than the main swirler. The swirlers are provided so as to be concentric on the inner wall at the lower side of the first stage inner cylinder. In the steam separator, when the gas-liquid two-phase flow which flows in the vicinity of the axial center of the first stage inner cylinder passes the auxiliary swirler, it is separated into steam and water by the centrifugal force. The separated water (droplets) is introduced into the main swirler. When the separated water (droplets) passes the main swirler, it is separated at the inner wall side of the first stage inner cylinder by the centrifugal force.

Pressure loss in a steam separator is reduced and steam separation capability is increased without increasing the moisture from the steam separator.

13 Claims, 9 Drawing Sheets

STEAM SEPARATOR, BOILING WATER REACTOR AND SWIRLER ASSEMBLY

CLAIM OF PRIORITY

The present application claims priority from Japanese application serial no. 2006-053713, filed on Feb. 28, 2006, the content of which is hereby incorporated by reference into this application.

BACKGROUND OF THE INVENTION

The present invention relates to a boiling water reactor (BWR), and to the steam separator used in this boiling water reactor and to the swirler assembly being included in the steam separator.

Generally, in a BWR, thermal energy is generated at a core, and due to the coolant (light water) is boiled. The steam generated at that time is supplied to a turbine. The steam rotates the turbine directly to cause power generation. In the reactor pressure vessel of this BWR, a core is disposed at the lower side, and a steam separator is disposed above the core. Two-phase flow including steam and water generated by the light water boiling in the core is introduced to the steam separator. The two-phase flow of steam and water is separated by the steam separator. High quality steam (proportion of steam mass flow rate to total mass flow rate) separated is supplied to the turbine. The BWR is described in Japanese Patent Laid-open No. 2000-153118 and Japanese Patent Laid-open No. 2001-183489.

SUMMARY OF THE INVENTION

A steam separator with high steam separation capability and small pressure loss is desired. However, improvement in steam separation capability is associated with pressure loss.

The object of the present invention is to provide a steam separator in which pressure loss can be reduced while the separation capability is increased, and the quality (proportion of steam mass flow rate in the total mass flow rate) at the outlet of the steam separator is not reduced, and increase in core flow rate and the associated increase in thermal power becomes possible.

The steam separator of the present invention comprises an outer main swirler and an inner auxiliary swirler which is smaller than the main swirler, and the swirlers are provided so as to be concentric an inner wall of a diffuser or on a lower inner wall of a first stage inner cylinder in order to separate steam and water of the gas-liquid two-phase flow. In the steam separator, when the gas-liquid two-phase flow which passes through the vicinity of an axial center of the diffuser or the first stage inner cylinder passes the auxiliary swirler, the steam separator separates the gas-liquid two-phase flow into steam and water. The separated water is introduced to the main swirler. When the water passes the main swirler, the water is separated at the inner wall by centrifugal force.

For this reason, the steam separator performs separation into steam and water in accordance with the difference in the behavior of the gas-liquid two-phase flow in the vicinity of the flow path axis and the gas-liquid two-phase flow at a periphery portion in the stand-pipe and the first stage inner cylinder. In the steam separator, because the auxiliary swirler is smaller than the main swirler, pressure loss in the vicinity of the flow path axis where the steam proportion is large, is controlled to be small.

According to the present invention, increase in moisture content at the outlet of the steam separator, in other words decrease in the quality at the outlet of the steam separator can be eliminated by reducing pressure loss in the steam separator and improving the steam separation capability. As a result, even if the core flow rate and the reactor power are increased, pressure loss is not increased and thus steam and water can be efficiently separated.

BRIEF DESCRIPTION OF THE DRAWINGS

FIG. 2d is a pattern diagram showing the mounting structure for the auxiliary swirler shown in FIG. 2a.

FIG. 3b is a pattern diagram showing the mounting structure for the auxiliary swirler shown in FIG. 3a.

FIG. 4b is a pattern diagram showing the mounting structure for the auxiliary swirler shown in FIG. 4a.

FIG. 5b is a sectional view from a line L-L shown in FIG. 5a.

FIG. 5c is a sectional view from a line M-M shown in FIG. 5a.

FIG. 6b is a sectional view taken along a line O-O shown in FIG. 5a.

FIG. 7b is a sectional view taken along a line P-P shown in FIG. 7a.

DESCRIPTION OF THE PREFERRED EMBODIMENT

The following is a description of an embodiment of the present invention with reference to the drawings. First, a steam separator of this embodiment will be described. A schema of a structure of a forced circulation BWR or a natural circulation BWR which uses the steam separator will be described.

[Structure of Steam Separator]

Figure 1:
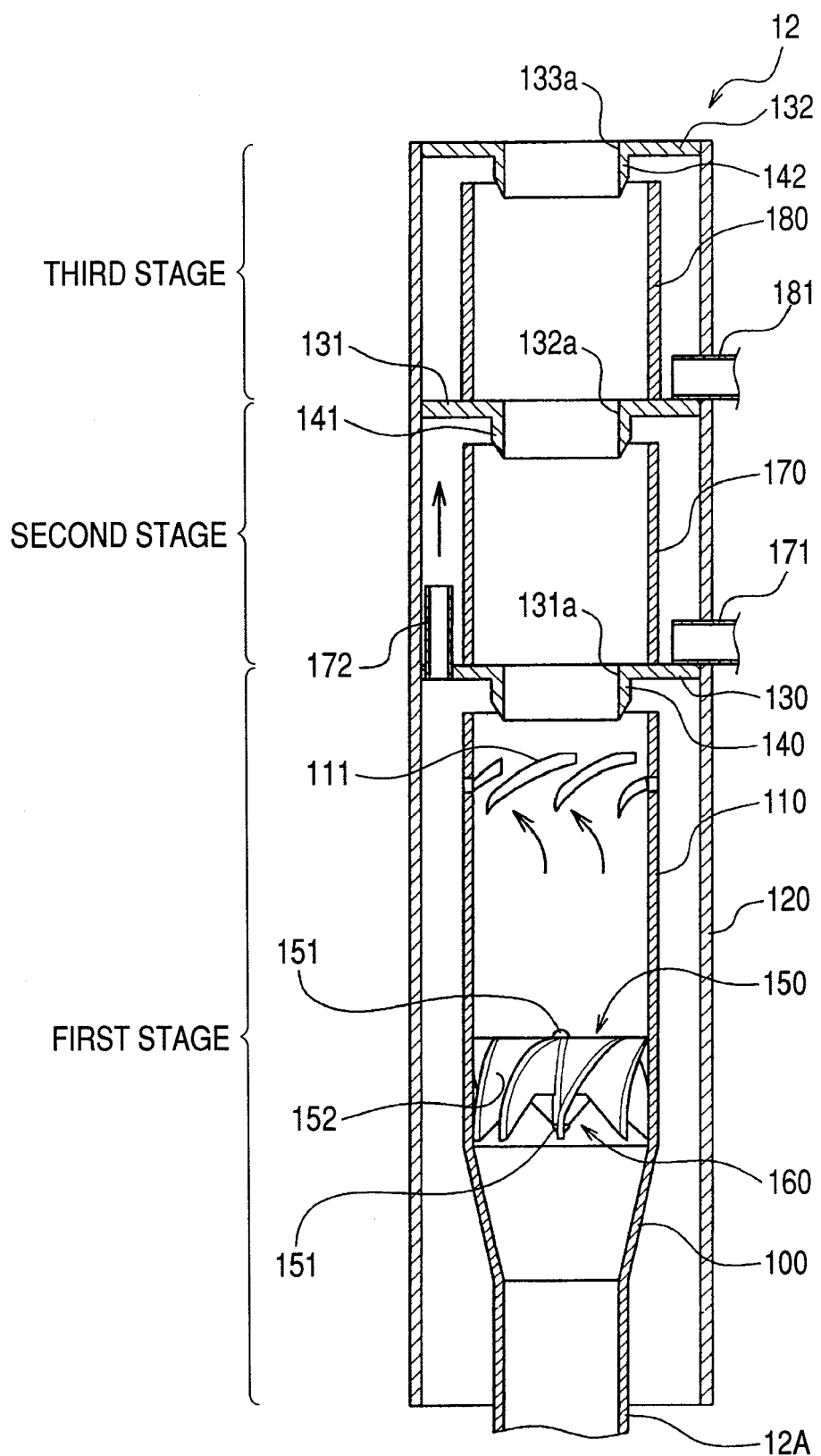
FIG. 1 is a longitudinal sectional view showing the structure of the steam separator according to an embodiment of the present invention.

The structure of the steam separator of this embodiment will be described. FIG. 1 shows a longitudinal section of the steam separator of this an embodiment. The steam separator 12 passes the two-phase flow of cooling water (coolant) and steam ascending from a core (not shown), and separates the two-phase flow into the cooling water and the steam. The separated cooling water is re-circulated to the core. The separated steam is supplied to the turbine (not shown).

The steam separator 12 mainly comprises a stand-pipe 12b, a diffuser 100, a first stage inner cylinder 110, outer cylinders (first stage, second stage and third stage) 120, a first stage annular plate 130, a first stage pick-off ring 140, a main swirler 150 and an auxiliary swirler 160.

The stand-pipe 12 forms a flow path in which the gas-liquid two-phase flow of the cooling water and the steam exhausted from the core (not shown) flows from lower portion toward upper portion. As described hereinafter, the stand-pipes 12b are aligned with and inserted into a plurality of holes (not shown) formed on a shroud head described hereinafter and then connected. The connection the stand-pipes 12b and the shroud head may be done by welding for example.

As shown in FIG. 1, the diffuser 100 has a configuration of substantially inverse conical trapezoid. For this reason, the diffuser 100 connects to the upper end surface of the stand-pipe 12b and forms a flow path. Flow path area in the diffuser 100 is expanded in the upward direction (downstream of the flow path) so as to be greater than the flow path area at upper end of the stand-pipe 12b. The diffuser 100 and the standpipe 12b may be connected by welding for example.

The first stage inner cylinder 110 connects to the upper end surface of the diffuser 100 and forms a flow path. The connection of the first stage inner cylinder 110 and the diffuser 100 also may be done by welding. The first stage inner cylinder 110 is equipped with a main swirler 150 which has a hub 151 and a main swirl blade 152, and an auxiliary swirler 160 at the lower portion (upstream side) respectively. It is to be noted that the main swirler 150 and the auxiliary swirler 160 will be described hereinafter.

Also, incline slits 111 which are substantially band-like and which incline in the direction opposite to the incline direction of the main swirl blades 152 of the main swirler 150 are formed on the upper portion of the first stage inner cylinder 110. The incline slits 111 are formed uniformly along the entire periphery on the upper portion of the first stage inner cylinder 110. As described hereinafter, the incline slits 111 discharges the liquid film which transfers on the inner surface of the first stage inner cylinder 110, outside the first stage inner cylinder 110.

It is to be noted that the liquid film collects the cooling water separated by the main swirler 150, and as described hereinafter, it is pushed to flow out to the gas-liquid two-phase flow swirl ascending via the main swirler 150 and the auxiliary swirler 160. For this reason, the liquid film also flows along the inner surface of the first stage inner cylinder 110. The swirl flow of the liquid film is a swirl flow in the same direction as the gas-liquid two-phase flow.

An outer cylinder 120 forms an annular space which encloses the first stage inner cylinder 110 so as to be a concentric circle with a space between. As shown in FIG. 1, the outer cylinder 12 forms a single unit steam separator provided with a function of each steam separation section separated into the first stage through the third stage. The first stage inner cylinder 110, a first stage annular plate 130, a second stage inner cylinder 170, a second stage annular plate 131 and a third stage inner cylinder 180 are disposed in the outer cylinder 120. The function of each steam separation section will be described in the following.

The first stage annular plate 130 seals the upper end peripheral edge of the first inner cylinder 110 to be annular and separates into upper and lower sections in the outer cylinder 120. The first stage annular plate 130 has a circular hole 131a formed which has a smaller diameter than the inner diameter of the first stage inner cylinder 110.

The first stage pick-off ring 140 is a cylindrical body and is provided with the first stage annular plate 130 and is extended toward the downward direction from the inner peripheral edge on which the circular hole 131a of the first stage annular plate 130. A flow path is formed in the first stage pick-off ring 140. This first stage pick-off ring 140 has a smaller diameter than the inner diameter of the first stage inner cylinder 110. The first stage pick-off ring 140 separates the swirl flow in annular region near the inner surface of the first stage inner cylinder 110 and the swirl flow at the center in the first stage inner cylinder 110. The swirl flow in annular region near the inner surface is flowed into the annular space between the first stage inner cylinder 110 and the outer cylinder 120. The swirl flow at the center is flowed into the circular hole 131a.

The main swirler 150 includes a hub 151 which passes through the axial center of the gas-liquid two-phase flow path and a plurality of main swirl blades 152 which are mounted radially around the hub 151. There may be eight main swirl blades 152 for example. The main swirler 150 is fixed the outer edge of the main swirl blade 152 to the inner surface of the diffuser 100 or to the lower inner surface of the first stage inner cylinder 110. As a result, the main swirler 150 forms the main swirl flow path in the space formed by any inner wall, the hub 151 and the main swirl blades 152.

The auxiliary swirler 160 separates the gas-liquid two-phase flow at the axial center vicinity of the first stage inner cylinder 110 into high quality steam with little pressure loss. The structure and function of the auxiliary swirler 160 will be described in detail hereinafter with reference to FIG. 2 to FIG. 9. It is to be noted that the steam separator 12 functions as a first stage steam separation section in the region between the diffuser 100 and the first stage annular plate 130. Also, the steam separator 12 functions as a second and third stage steam separation section. Next, the components which function as the second stage and third stage steam separation section will be described.

The steam separator 12 has the second stage inner cylinder 170, a second stage discharge water port 171, an exhaust pipe 172, the second stage annular plate 131, and a second stage pick-off ring 141. The region from the first stage annular pate 130 to the second stage annular plate 131 which includes these components function as the second stage steam separation section.

The second stage annular plate 131 seals the upper end peripheral edge of the second stage inner cylinder 170 as a ring and separates inside space of the outer cylinder 120 above the first stage annular plate 130 into upper and lower sections. A circular hole 132a whose diameter is smaller than the inner diameter of the second stage inner cylinder 170 is formed in the second stage annular plate 131. The second stage pick-off ring 141 is a cylindrical body and is provided with the first stage annular plate 130 and is extended toward the downward direction from the inner peripheral edge on which the circular hole 132a of the second stage annular plate 131. A flow path is formed in the second stage pick-off ring 141.

The second stage steam separation section includes a second stage discharge water port 171 provided to the outer cylinder 120 in vicinity of the first stage annular plate 130, and a discharge pipe 172 which extends in the upward direction from the first stage annular plate 130 between the outer cylinder 120 and the second stage inner cylinder 170. The second stage discharge water port 171 discharges the cooling water separated by the second stage pick-off ring 141 in the same manner as the first stage pick-off ring 140, from the outer cylinder 120.

The exhaust pipe 172 discharges steam that has collected at the lower side of the first stage annular plate 130 toward an annular space formed between the outer cylinder 120 and the second stage inner cylinder 170. Without the exhaust pipe 172, the steam that has collected here would follow the flow of the cooling water between the first stage inner cylinder 110 and the outer cylinder 120 and flow downward through the annual space. Generally, water level of the reactor is near the center of the first stage steam separation section. The steam discharged from the annular space between the first stage inner cylinder 110 and the outer cylinder 120 flows into a down-comer 9 (see FIG. 12 or FIG. 13) between a core shroud 8 (see FIG. 12 or FIG. 13) and an inner surface of a reactor pressure vessel 6 (see FIG. 12 or FIG. 13). The amount of steam flowing into the down-comer 9 (see FIG. 12 or FIG. 13) in this manner is called the carry-under. This amount is preferably low in view of prevention of cavitation in an internal pump 90 (see FIG. 12). In this embodiment, by attaching the exhaust pipe 172, the steam which enters the annular space between the first stage inner cylinder 110 and the outer cylinder 120 and causes carry-under increase can be discharged outside the steam separator 12 from the second stage port 171 through the exhaust pipe 172. As a result, the steam discharged below the reactor water level from the annular space between the first stage inner cylinder 110 and the outer cylinder 120 can be reduced and so it becomes possible to reduce the carry-under amount. It is to be noted that the second stage discharge water port 171 is positioned above the water surface of the cooling water and thus the increase in discharge amount of the steam from this position does not affect carry-under properties.

Next, the structures which function as the third stage steam separation section will be described. It is to be noted that the structures are the same as those of the second stage steam separation section. For this reason, the corresponding relationship will be described and detailed descriptions thereof will be omitted. The steam separator 12 functions as the third stage steam separation section, and thus it comprises a third stage inner cylinder 180 which is the same as the second stage inner cylinder 170, a third stage discharge water port 181 which is the same as the second stage discharge water port 171, an exhaust pipe (not shown) which is the same as the exhaust pipe 172, a third stage annular plate 132 which is the same as the second stage annular plate 131, and a third stage pick-off ring 142 which is the same as the second stage pick-off ring 141. It is to be noted that a hole 132a which is the same as the hole 131a is formed in the third stage annular plate 132.

Figure 2A:
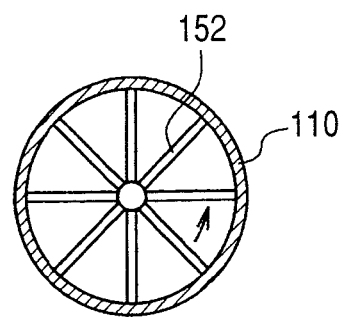
FIG. 2a is a cross sectional view showing a first stage inner cylinder shown in FIG. 1.
Figure 2B:
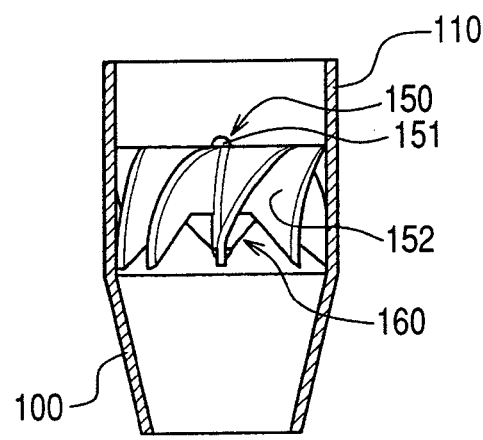
FIG. 2b is a longitudinal sectional view showing the first stage inner cylinder including a main swirler and an auxiliary swirler shown in FIG. 1.
Figure 2C:
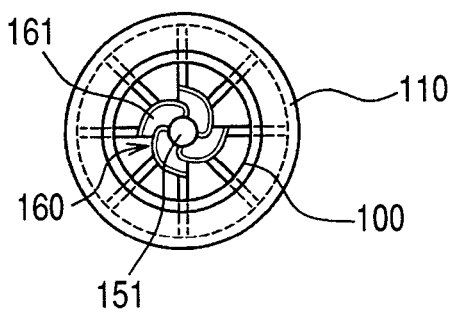
FIG. 2c is a structural view showing the first stage inner cylinder in the state that is viewed from the lower side.
Figure 2D:
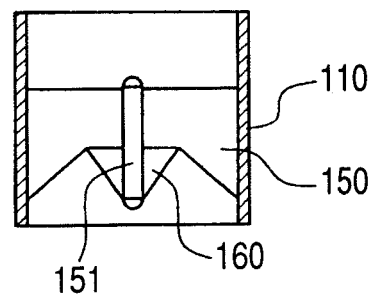

The auxiliary swirler 160 will be described with reference to FIG. 2a to FIG. 9. FIG. 2a to FIG. 2d show structure of the auxiliary swirler 160. In FIG. 2a, the first stage inner cylinder 110 is cut in the horizontal direction and the cross-sectional surface is viewed from the upper side. FIG. 2b shows the first stage inner cylinder 110 in the vicinity of the main swirler 150 and the auxiliary swirler 160. FIG. 2c is a view from the lower side of the diffuser 100. FIG. 2d is a pattern diagram showing the mounting structure for the auxiliary swirler 160.

As shown in FIG. 2c, the auxiliary swirler 160 has spiral auxiliary swirl blades 161. Here four auxiliary swirl blades 161 are shown. The auxiliary swirl blades 161 are formed such that the width direction is shorter than the radius of the mounting location of the first stage inner cylinder 110.

It is to be noted that the outer diameter of the auxiliary swirler 160 is preferably smaller than the inner diameter of the standpipe 12b. This is because inside the standpipe 12b also, there is a large amount of the cooling water in the liquid film state is present mainly on the inner surface of the standpipe 12b, and there is a large amount of steam closer to the inside than the liquid film. Thus the cooling water at the inner surface vicinity of the standpipe 12b is preferably separated by the main swirler 150. The auxiliary swirler 160 is preferable for separating water (droplets) with large amounts of steam that is more inward in view of pressure loss reduction and maintaining steam separation properties.

The number of auxiliary swirl blades 161 is at least one and is preferably less than the number of main swirl blade 152. As described above, the steam proportion at the auxiliary swirler 160 is high. Thus, the required function for the auxiliary swirler 160 is to introduce the water (droplets) from the auxiliary swirler 160 to the main swirl blade 152 and the same steam separation function as the main swirl blade 152 is not necessary. In this manner, the fact that the functions of the main swirl blade 152 and the auxiliary swirler 160 are separated in accordance with the difference in the flow pattern of gas-liquid two-phase flow in the radial direction of the swirler section (the main swirler 150 and the auxiliary swirler 160) is a feature of this embodiment. Because the auxiliary swirler 160 does not require steam separation capability to the extent of the main swirl blade 152, the steam separation capability is sufficient even if the number of auxiliary swirl blades 161 in the auxiliary swirler 160 is less than the number of main swirl blade 152. Thus, it becomes possible to reduce pressure loss while maintaining steam separation capability. This shows that overall the auxiliary swirler 160 is preferably smaller than the main swirler 150. In addition, the thickness of the auxiliary swirl blades 161 is preferably less than that of the main swirl blade 152 in view of pressure loss reduction and manufacturing properties.

The auxiliary swirl blades 161 are mounted at the center of the hub 151. Furthermore, the auxiliary swirl blades 161 are positioned lower (upstream side) than the terminal end of the main swirl blade 152. It is to be noted that configuration and function of the auxiliary swirl blades 161 will be described in the following using FIG. 5a-FIG. 8b.

The auxiliary swirler 160 uses the spiral space along the auxiliary swirl blade 161 which is formed of the hub 151 and the auxiliary swirl blades 161 as the auxiliary swirl flow path. It is to be noted that the hub 151 of the main swirler 150 is also used as the auxiliary swirler 160 and they are integrally formed, but they may also be formed separately. In this case, the hub formed separately is called the second hub with respect to the hub 151 and the second hub and the hub 151 are co-axial. It is preferable to connect to the end surfaces each other. Also, the diameter of the hub 151 may be changed by the portion which connects the main swirl blade 152 and the portion which connects the auxiliary swirl blade 161.

That is to say, the auxiliary swirler 160 shown in FIG. 2a, FIG. 2b and FIG. 2c are mounted to the lower portion of the main swirler 150 that is mounted on the inner surface of the first stage inner cylinder 110 so as to be integral with the main swirler 150 on the same hub 151, as shown in FIG. 2d.

Figure 3A:
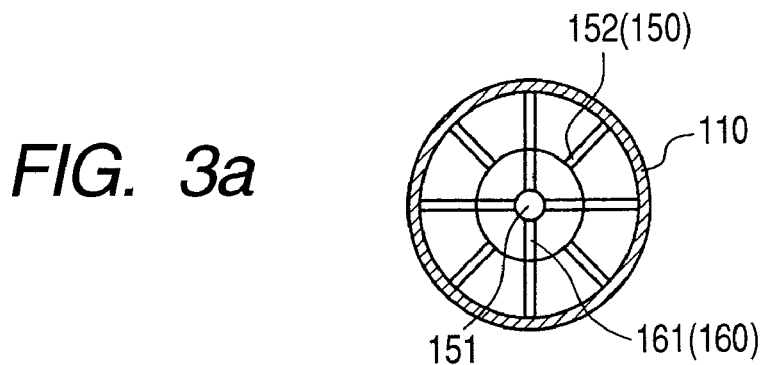
FIG. 3a is a cross sectional view showing another embodiment of a first stage inner cylinder.
Figure 3B:
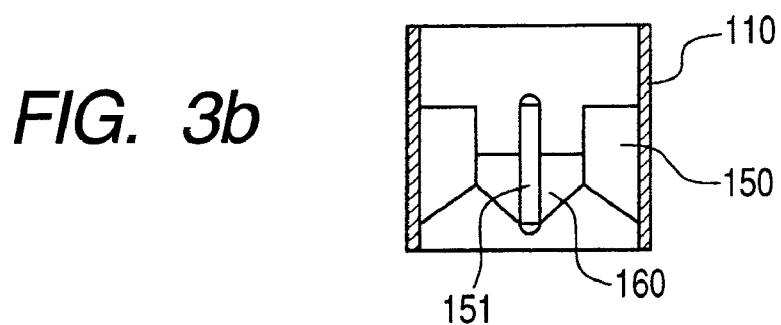

Next, another example of the mounting structure for the auxiliary swirler 160 is described. FIG. 3a and FIG. 3b show another mounting structure of the auxiliary swirler. FIG. 3a is equivalent to FIG. 2a. FIG. 3b is equivalent to FIG. 2d. As shown in FIG. 3a and FIG. 3b, the center axis portion of the main swirl blade 152 of main swirler 150 is in a notched state. The auxiliary swirler 160 is disposed on the center axis portion. This auxiliary swirler 160 has the auxiliary swirl blades 161 mounted to the hub 151. The auxiliary swirl blades 161 are connected to the main swirl blades 152.

Figure 4A:
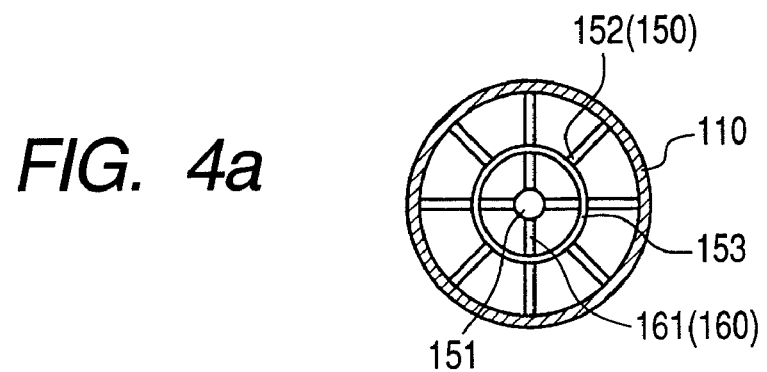
FIG. 4a is a cross sectional view showing another embodiment of a first stage inner cylinder.
Figure 4B:
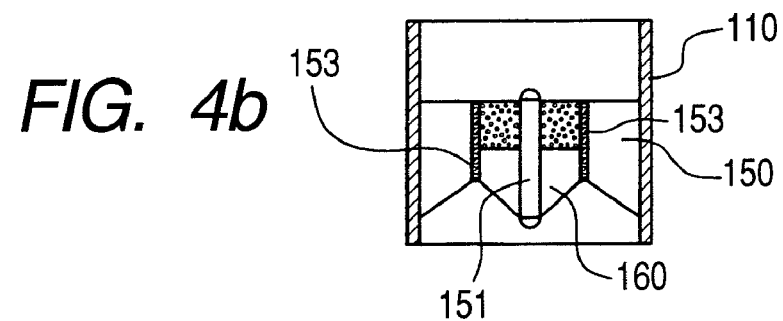

Next, another example of the mounting structure for the auxiliary swirler 160 is described. FIG. 4a and FIG. 4b show another mounting structure for the auxiliary swirler. FIG. 4a is equivalent to FIG. 2a. FIG. 4b is equivalent to FIG. 2d. As shown in FIG. 4a and FIG. 4b, the center axis portion of the main swirl blade 152 (FIG. 4a) of the main swirler 150 is in a notched state. The auxiliary swirler 160 is disposed on the center axis portion. The structure up until this point is the same as that of FIG. 3a and FIG. 3b. In this auxiliary swirler 160, the auxiliary swirl blades 161 are mounted on the hub 151. Meanwhile, the main swirler 150 have mounted the main swirl blades 152 on the annular hub 153. The auxiliary swirler 160 is inserted into the annular hub 153 in an integral structure. In this case, after the main swirler 150 and auxiliary swirler 160 are assembled separately, they can be attached together. A plurality of holes 153a is formed in the annular hub 153 so as to make it porous and this prevents obstruction of the inflow of the droplets flying off in the peripheral direction from the auxiliary swirler 160 into the main swirler 150.

Figure 5A:
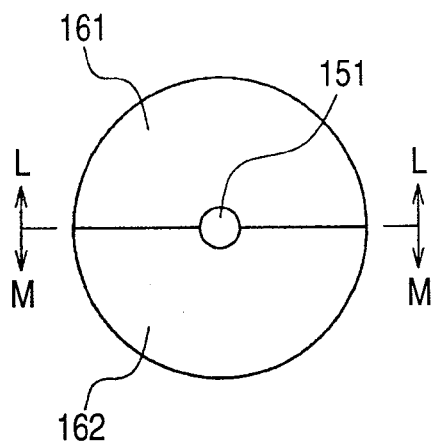
FIG. 5a is a structural view showing an auxiliary swirler having two auxiliary swirl blades in the state that is viewed from the lower side.
Figure 5B:
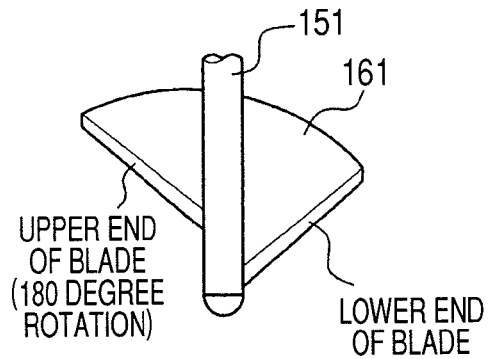
Figure 5C:
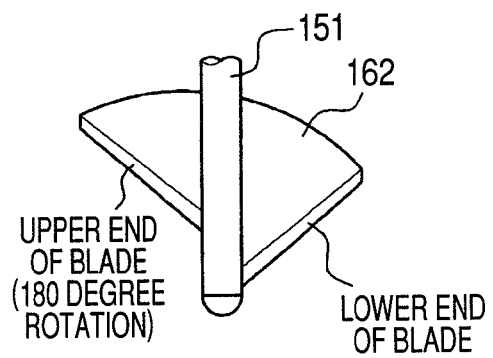

Next, the configuration and function of the auxiliary swirl blades 161 will be described using FIG. 5a-FIG. 8b. FIG. 5a and FIG. 5b show an example of an auxiliary swirler having two auxiliary swirl blades. FIG. 5a shows the two auxiliary swirl blades when viewed from the lower side. FIG. 5b is a view from the L-L cross-sectional direction in FIG. 5a. FIG. 5c is a view from the M-M cross-sectional direction in FIG. 5a.

In this case, the two auxiliary swirl blades 161 and 162 are at the axial center of the hub 151 and they are mounted on the hub 151 so as to form a spiral in which each covers a 180 degree range. It is to be noted that as shown in FIG. 2, in the case where four auxiliary swirl blades 161 are mounted on the hub 151 in the center of its axis and each may be mounted so as to form a spiral in which each covers a 90 degree range for example.

Figure 6A:
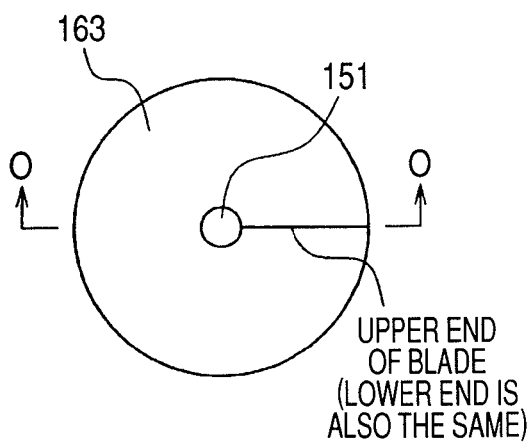
FIG. 6a is a structural view showing another embodiment of an auxiliary swirler having one auxiliary swirl blade in the state that is viewed from the lower side.
Figure 6B:
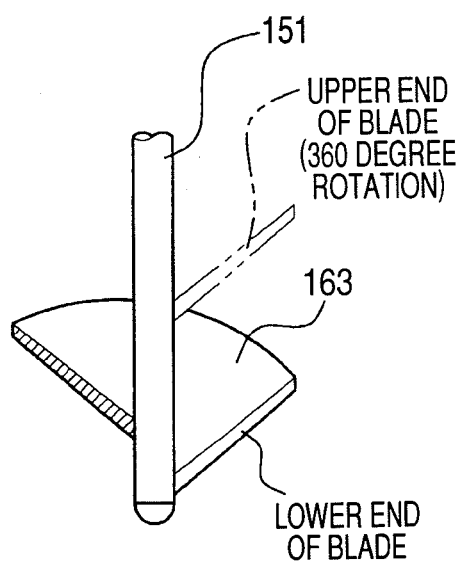

FIG. 6a and FIG. 6b show another embodiment of an auxiliary swirler having one auxiliary swirl blade. FIG. 6a shows the one auxiliary swirl blade when viewed from the lower side. FIG. 6b is a view from the O-O cross-sectional direction in FIG. 6a. In this case, the one auxiliary swirl blade 163 is mounted on the hub 151 in the center of its axis and is mounted so as to form a spiral which covers a 360 degree range for example.

Figure 7A:
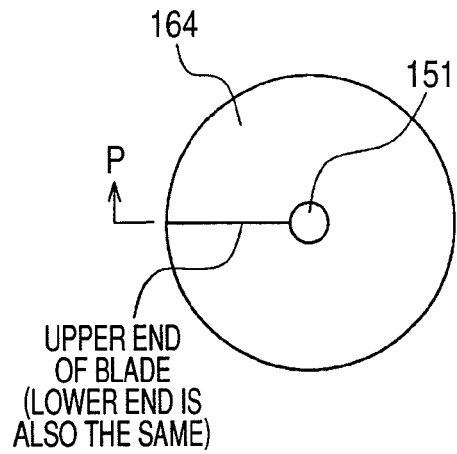
FIG. 7a is a structural view showing another embodiment of an auxiliary swirler having one auxiliary swirl blade in the state that is viewed from the lower side.
Figure 7B:
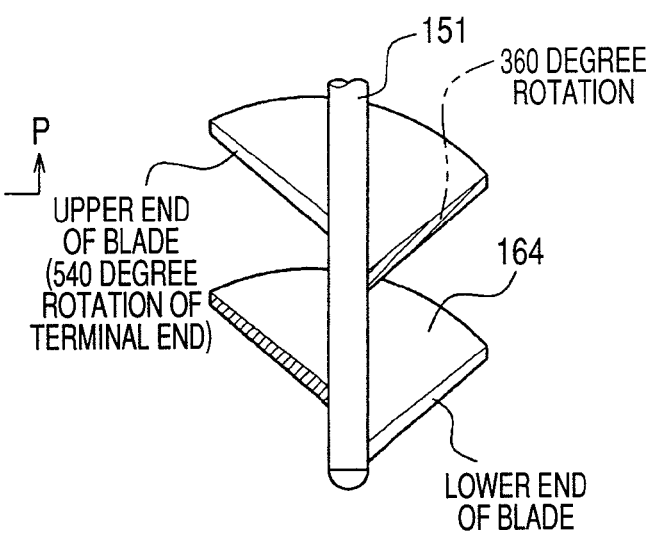

FIG. 7a and FIG. 7b show another embodiment of an auxiliary swirler having one auxiliary swirl blade. FIG. 7a shows the one auxiliary swirl blade when viewed from the lower side. FIG. 7b is a view from the P-P cross-sectional direction in FIG. 7a. In this case, the one auxiliary swirl blade 164 is mounted to the hub 151 in the center of its axis and so as to form a spiral which covers a 540 degree (one and a half rotation) range for example.

Figure 8A:
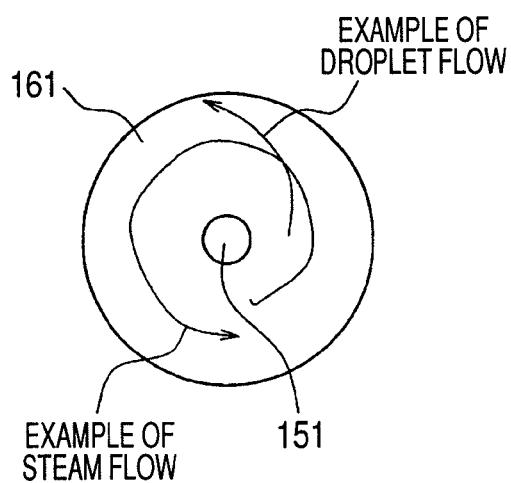
FIG. 8a is a pattern drawing showing an example of steam flow and droplet flow in the auxiliary swirler which is viewed from below.
Figure 8B:
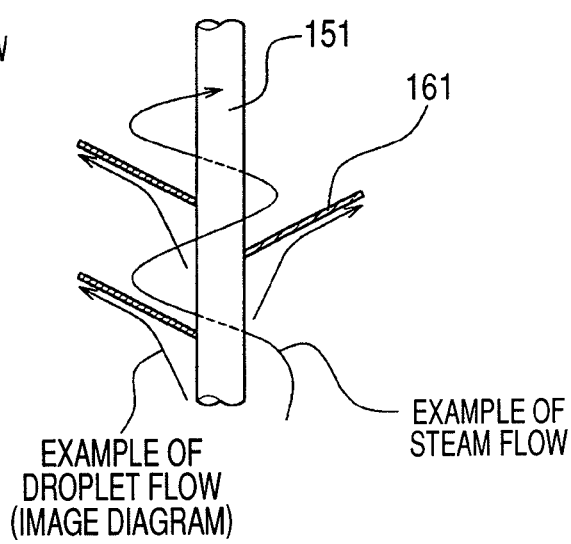
FIG. 8b is a pattern drawing showing an example of the steam flow and the droplet flow in a longitudinal section of the auxiliary swirler.

Next, the functions of the auxiliary swirler 161 will be described. FIG. 8a and FIG. 8b is a pattern drawing for describing the function of the auxiliary swirler. FIG. 8a shows an example of the steam flow and the droplet flow (water) when the auxiliary swirler is viewed from below. FIG. 8b shows an example of the steam flow and the droplet flow (water) when the auxiliary swirler is viewed from the transverse direction.

In this case, the steam flows together with the steam flow around the hub 151 along the spiral of the auxiliary swirl blades 161. Meanwhile, when the droplets (water) arrive at the auxiliary swirl blade 161, they are pushed to move by the steam flow on the auxiliary swirl blade 161. When this happens, the droplets immediately move away from the hub 151 due to the centrifugal force. In this manner, the droplets (water) and the steam are separated.

It is to be noted that when the droplets (water) fly off from the auxiliary swirl blade 161 in the peripheral direction, they enter the steam flow which flows toward the main swirl blade 152 (see FIG. 1 and FIGS. 2a-2d) and then reach the main swirl blade 152. When this happens, as is the case with the auxiliary swirl blade 161, the droplets (water) are led further in the peripheral direction by the centrifugal force and then arrive at the inner surface of the first stage inner cylinder 110. The droplets (water) that have reached the inner surface of the first stage inner cylinder 110, form a liquid film at the inner surface and as described above, are discharged from the steam separator 12 through the incline slits 111.

That is to say, because the specific gravity and penetration force of the droplets (water) are large, they tend to collide with the inclined auxiliary swirl blade 161 (main swirl blade 152). Because the droplets (water) has a high viscosity, when they come in contact with the auxiliary swirl blade 161 (main swirl blade 152), the tendencies to flow along the auxiliary swirl blade 161 (main swirl blade 152) and to be led in the peripheral direction by centrifugal force are large. On the other hand, the specific gravity and viscosity of steam are small, and unlike the droplets, it forms a continuous phase, and thus a swirl flow of the steam is formed by the effect of the pressure gradient, but the steam is not led in the outer periphery direction along the auxiliary swirl blade 161 (main swirl blade 152) to the extent of the droplets (water). For this reason, separation of the steam is carried out by the auxiliary swirl blade 161 and the main swirl blade 152.

It is known that the ratio (d/D) of the diameter d of the hub 151 and the diameter D of the first stage inner cylinder 110 is preferably between 0.13 and 0.25. The value of 0.13 herein is known as a lower limit of which in manufacturing it is no longer possible for the main swirl blade 152 (auxiliary swirl blade 160) to be installed in the first stage inner cylinder 110. Also the ratio is preferably 0.25 or lower in order to reduce pressure loss, but in the structure with only the main swirl blade 152, if the hub 151 is made thinner, high steam separation capabilities can not be obtained. For this reason, as is the case in this embodiment, by providing the auxiliary swirl 160, a steam separator 12 can be manufactured which has little pressure loss and high steam separation capability.

Next, the structure with the part in which the main swirler 150 and the auxiliary swirler 160 are combined will be described. This type of part in the process of being manufactured will be called swirler assembly herein. In the case where there are different manufacturers for the swirler assemblies, they are traded before the distribution process is complete.

Figure 9:
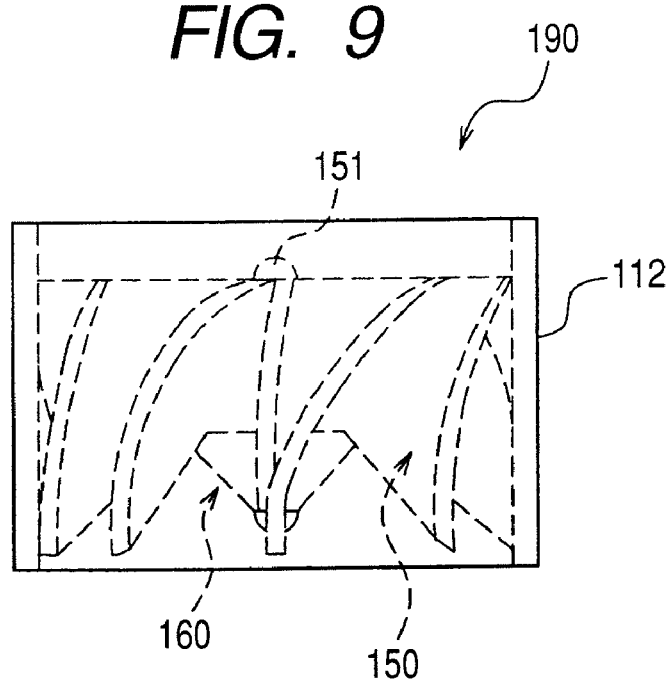
FIG. 9 is a structural view showing an example of a swirler assembly.

FIG. 9 shows an example of a swirler assembly. In this swirler assembly 190, the main swirler 150 and the auxiliary swirler 160 that are mounted on the hub 151 are attached and fixed inside the short cylinder 112 which forms a part of the first stage inner cylinder 110 (see FIG. 1). This structure shows a part of the structure described above.

Figure 10:
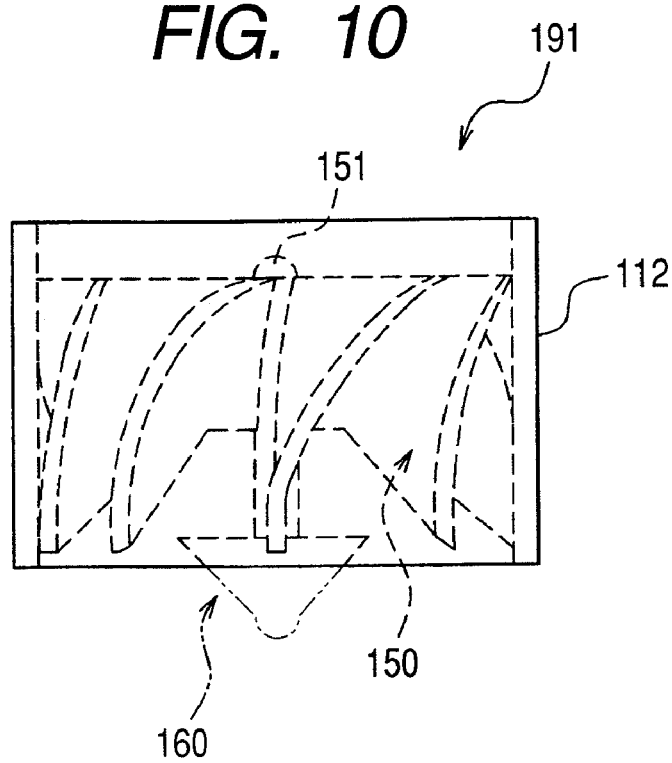
FIG. 10 is a structural view showing another example of the swirler assembly.

FIG. 10 shows another example of the swirler assembly. In the swirler assembly 191 also, the main swirler 150 and the auxiliary swirler 160 that are mounted on the hub 151 are attached and fixed inside the short cylinder 112 which forms a part of the first stage inner cylinder 110 (see FIG. 1). However, in the swirler assembly 191, the structure is such that the auxiliary swirler 160 is positioned lower than the main swirler 150 (upstream side). That is to say, the auxiliary swirler 160 is mounted on the hub 151 which projects from the main swirler 150.

Figure 11A:
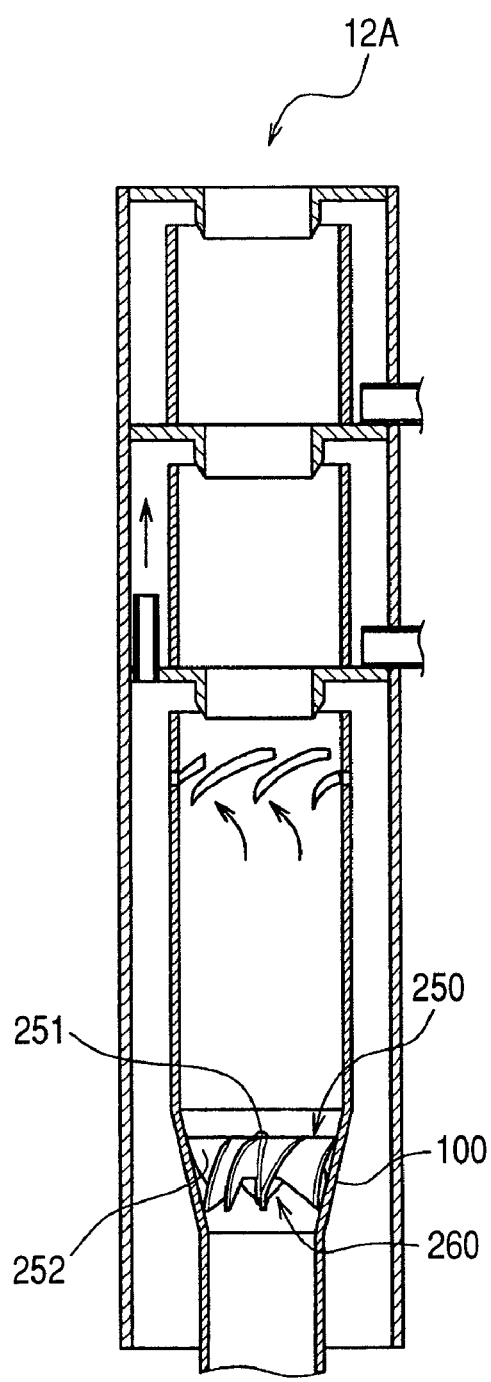
FIG. 11a is a structural view showing modified example of the steam separator.
Figure 11B:
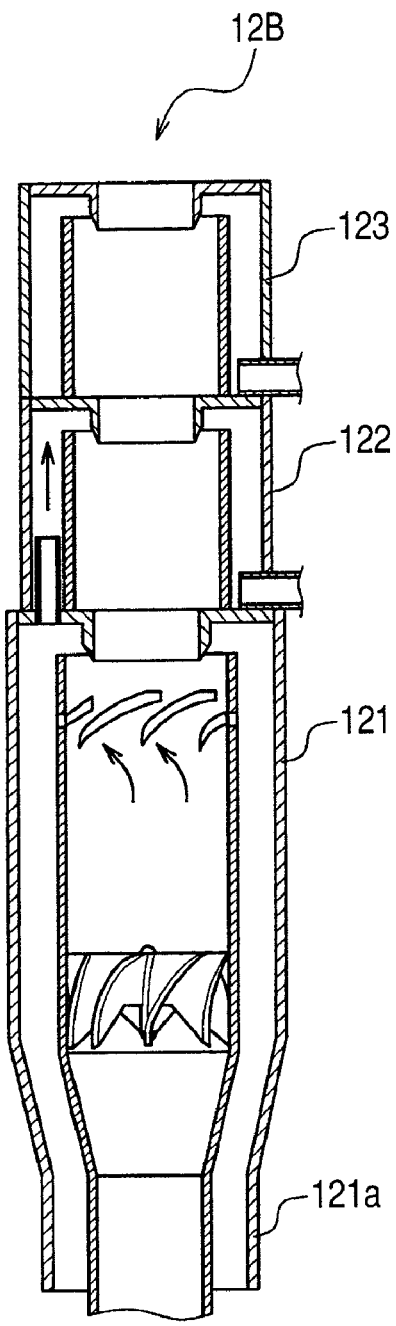
FIG. 11b is a structural view showing another modified example of the steam separator.

Next, a modified example of the steam separator 12 will be described. It is to be noted that only differences from FIG. 1 will be described. FIG. 11 shows a modified example of the steam separator of this embodiment and is equivalent to FIG. 1. FIG. 11a and FIG. 11b show modified example and another modified example respectively.

As shown in FIG. 11a, the steam separator 12A has inside the diffuser 100, a main swirler 250 which has main swirl blades 252 mounted on the hub 251, and auxiliary swirler 260 which is also mounted on the hub 251. In this case, the main swirl blades 252 are configured such that the diameter at the upper side is larger than that at the lower side to match the configuration of the diffuser 100. In this example, steam separation capability is improved due to swirling but the pressure loss reduction effect is reduced.

As shown in FIG. 11b, the steam separator 12B has the functions of steam separation section of three stages due to the first stage outer cylinder 121, the second stage outer cylinder 122 and the third stage outer cylinder 123. In the steam separator 12B, the diameters of the second stage outer cylinder 122 and the third stage outer cylinder 123 are smaller than that of the first stage outer cylinder 121. Also, the diameter of the outer cylinder 120 at the lower end vicinity of the first stage steam separation section may be made small to form the small diameter portion 121a. In this case, the flow path width of the annular space between the outer cylinder 120 and the stand-pipe 12b becomes smaller and thus the amount of the steam carry-under is reduced.

[BWR Outline]

The steam separator 12 of this embodiment may function by being used in a forced circulation boiling water reactor in which light water (cooling water) is circulated forcely by using a circulation pump and in a natural circulation boiling water reactor in which the light water is circulated by natural circulation. Thus the structure of the forced circulation BWR and the natural circulation BWR will be described in the following, and the function of the steam separator 12 in each embodiment will be described.

[Forced Circulation BWR]

Figure 12:
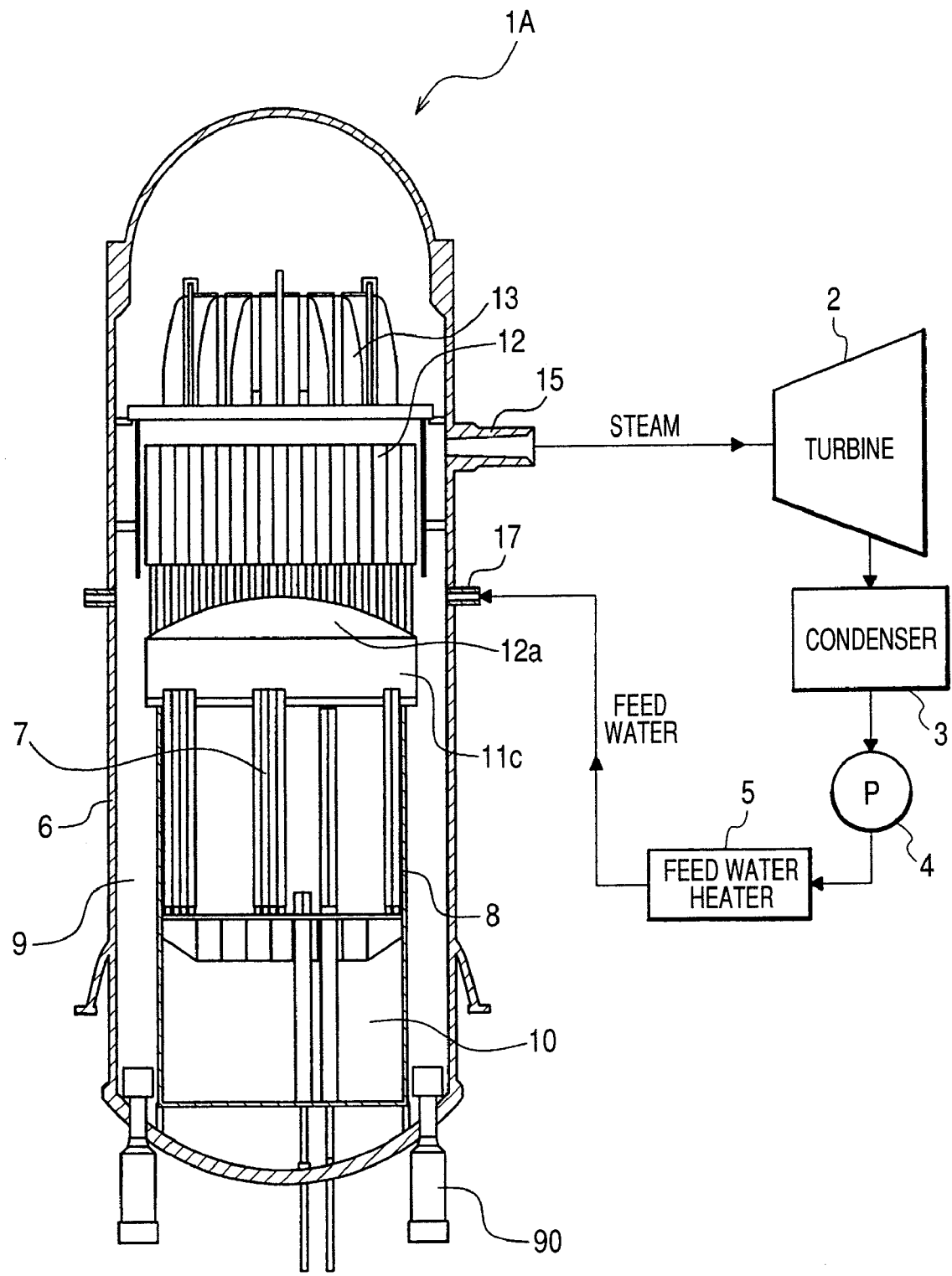
FIG. 12 is a structural view showing a forced circulation BWR that is equipped with the steam separator shown in FIG. 1.

FIG. 12 shows the structure of the forced circulation BWR having the steam separator 12 shown in FIG. 1. In the forced circulation BWR 1A, a plurality of steam separators 12 having the structure described above are stored at the upper portion of the reactor pressure vessel (called pressure vessel hereinafter) 6. The following is a description of the structure inside the pressure vessel 6.

A cylindrical core shroud (called shroud hereinafter) 8, which is concentric with the pressure vessel 6, is installed at a lower portion in the pressure vessel 6. A core lower plenum (called lower plenum hereinafter) 10 is formed under the shroud 8 in the pressure vessel 6. A core 7 is disposed above this upper plenum 10 and surrounded by the shroud 8. There is also a core upper plenum (called upper plenum hereinafter) 11c above the core 7. A shroud head 12a provided to the shroud 8 is disposed above the upper plenum 11c. It is to be noted that an annular space called down-comer 9 is formed between the pressure vessel 6 and the shroud 8, and this functions as a circulation path for the light water.

A prescribed number of holes (not shown) through which the coolant passes are provided in the shroud head 12a. Stand-pipes 12b of the plurality of steam separators 12 are inserted into these holes, and the plurality of steam separators 12 is aligned in parallel. That is to say, the flow paths which join the core 7 and the steam separator are connected via the upper plenum 11c. Also, a steam dryer 13 is provided above the steam separator 12. A feed water inlet nozzle 17 and a steam outlet nozzle 15 are provided at the side wall of the pressure vessel 6. Internal pumps 90 are provided at the lower portion of the reactor pressure vessel 6.

In the forced circulation BWR 1A, the steam generated in the core 7 flows in each of the steam separators 12 mounted on the shroud head 12a via the upper plenum 11c as a two-phase flow including the light water. In the steam separators 12, the introduced gas-liquid two-phase flow passes through from the downward direction to the upward direction. At these steam separators 12, the gas-liquid two-phase flow in the vicinity of an axial center of the first stage inner cylinder 110 is separated into steam and water by the auxiliary swirler 160 and the main swirler 150 (see FIG. 1). The separated steam flows upward along the axis, while the separated water (droplets) moves in the peripheral direction due to the centrifugal force.

At the steam separator 12, the gas-liquid two-phase flow that passes though the periphery portion in the first stage inner cylinder 110 is separated into steam and water by the main swirler 150 (see FIG. 1). At this time, the water separated by the auxiliary swirler 160 (see FIG. 1) flows in the periphery portion from the vicinity of the axial center and is mixed with the gas-liquid two-phase flowing in the periphery portion. This water flows together with the flow in the main swirler 150 (see FIG. 1) and is separated by the centrifugal force. Because of this steam separator 12, steam containing moisture that could not be removed is supplied to the steam dryer 13 positioned above the steam separator 12.

The steam (saturated steam) from which moisture is further removed by the steam dryer 13 is exhausted from the steam outlet nozzle 15 and supplied to the turbine 2. This steam drives the turbine 2 and is rotated a generator (not shown) joined to the turbine 2, thereby power is generated. The steam exhausted from the turbine 2 is condensed at the condenser 3 and becomes condensed water. The condensed water, that is, the cooling water (light water) is supplied to a feed water heater 5 by a feed water heater 5. The cooling water heated by the feed water heater 5 is introduced to the pressure vessel 6 from the feed water nozzle 17.

Meanwhile, the water separated by the steam separator 12 is mixed with the cooling water supplied from the feed water inlet nozzle 17 and descends the down-comer 9 and is introduced to the core 7 via the lower plenum 10. At this time, the cooling water supplied to the core 7 is pressurized by the internal pump 90.

[Natural Circulation BWR]

Figure 13:
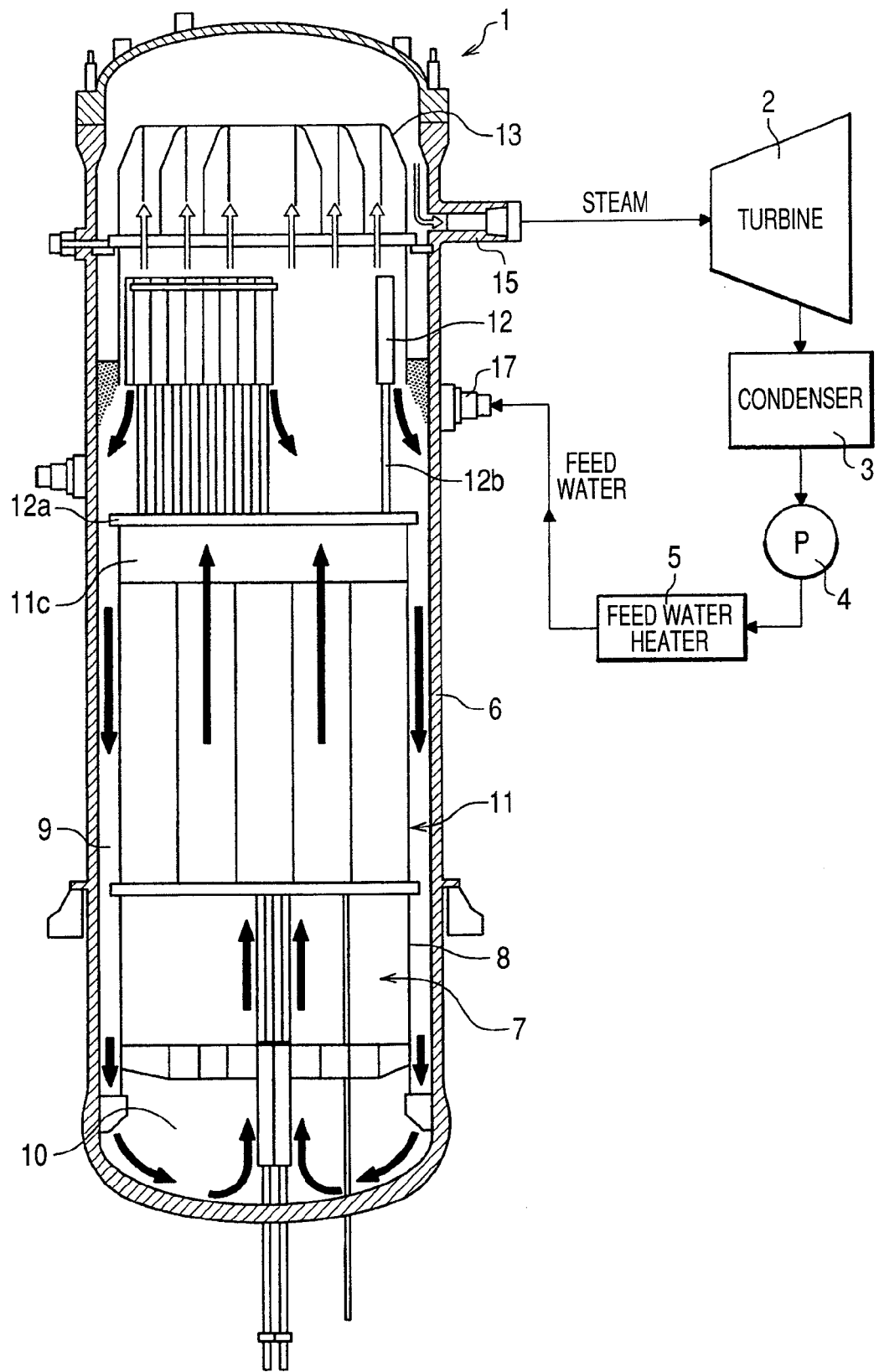
FIG. 13 is a structural view showing a natural circulation BWR that is equipped with the steam separator shown in FIG. 1.

FIG. 13 shows the structure of the natural circulation BWR having the steam separator 12 shown in FIG. 1. As is the case with the forced circulation BWR 1A (see FIG. 12), the natural circulation BWR 1 also has a plurality of steam separators 12 having the structure described above and being stored at the upper portion in the pressure vessel 6. The structure inside this pressure vessel 6 will be described in the following.

The natural circulation BWR 1 obtains a drive force required for natural circulation induced by the difference in specific gravity between the low density cooling water mixed of void, in other words, the steam (gas phase) generated in the core 7 and saturation temperature cooling water and the cooling water mixed with the feed water from supplied from the feed water inlet nozzle 17.

A shroud 8 which is concentric with the pressure vessel 6 is installed at a lower portion in the pressure vessel 6. A lower plenum 10 is formed under the shroud 8 in the pressure vessel 6. A core 7 is disposed above this upper plenum 10 and surrounded by the shroud 8. A chimney 11 is disposed above the core 7. The chimney 11 leads the gas-liquid two-phase flow exhausted from the core 7 upward and increases the natural circulation drive force. An upper portion of the chimney 11 includes an upper plenum 11c. The upper end of the upper plenum 11c is closed at the shroud head 12a.

A prescribed number of holes (not shown) through which the two-phase flow including the steam and the cooling water passes are provided in the shroud head 12a. Stand-pipes 12b of the plurality of steam separators 12 are inserted into these holes, and the plurality of steam separators 12 is aligned in parallel. That is to say, the flow paths which join the chimney 11 and the steam separator 12 are connected via the upper plenum 11c.

Also, a steam dryer 13 is disposed above the steam separator 12 in the pressure vessel 6. A feed water inlet nozzle 17 and a steam outlet nozzle 15 are provided to the side wall of the pressure vessel 6. It is to be noted that the shroud head 12a, the stand pipe 12b and the steam separator 12 are assembled as one unit and which can be taken out from the upper end of the chimney 11 together at the time of fuel exchange.

In the natural circulation BWR also, the steam generated at the core 7 passes through the chimney 11 as a gas-liquid two-phase flow including the droplets, and flow in each of the steam separators 12 mounted on the shroud head 12a via the upper plenum 11c. In the steam separators 12, the introduced gas-liquid two-phase flow passes from the downward direction to the upward direction. At the steam separators 12, the gas-liquid two-phase flow in the vicinity of an axial center of the first stage inner cylinder 110 is separated into steam and water by the auxiliary swirler 160 and the main swirler 150 (see FIG. 1). The separated steam flows upward along the axis while the separated water (droplets) moves in the peripheral direction due to the centrifugal force.

At the steam separator 12, the gas-liquid two-phase flow that passes though the periphery portion in the first stage inner cylinder 110 is separated into steam and water by the main swirler 150 (see FIG. 1). At this time, the water that is separated by the auxiliary swirler 160 (see FIG. 1) flows in the periphery portion from the vicinity of the axial center and is mixed with the gas-liquid two-phase flowing in the periphery portion. This water flows together with the flow in the main swirler 150 (see FIG. 1) and is separated by the centrifugal force. Thus the steam separator 12 separates into saturated steam and saturated water (droplets). Steam (saturated steam) containing moisture that could not be removed by this steam separator 12 is supplied to the steam dryer 13 positioned above the steam separator 12. This saturated steam is then supplied to the turbine 2 from the steam outlet nozzle 15 via the steam dryer 13 and used for power generation.

Meanwhile, the cooling water (light water) supplied from the feed water inlet nozzle 17 is mixed with the saturated water separated by the steam separator 12 and descends down the downcomer 9 and introduced to the shroud 8 via the lower plenum 10. The cooling water is heated by the core 7. The cooling water heated at the core 7 becomes a gas-liquid two-phase flow including the steam in the saturated state and is introduced to the steam separator 12 via the chimney 11, the upper plenum 11c and the stand-pipe 12b.

What is claimed is:

1. A steam separator for separating gas-liquid two-phase flow into liquid and gas, said steam separator comprising:
    a stand-pipe for introducing said gas-liquid two-phase flow from a lower portion thereof to an upper portion thereof;
    a diffuser for forming a flow path which connects to an upper end portion of said stand pipe and expands the flow path area toward the upward direction so as to be greater than that at an upper end of said stand-pipe;
    a first stage inner cylinder for forming a flow path being connected to an upper end portion of said diffuser;
    a first stage outer cylinder for forming an annular space which encloses said first stage inner cylinder;
    a first stage annular plate for sealing an inner peripheral edge of an upper end of said first stage outer cylinder and forming a circular hole with a diameter smaller than an inner diameter of said first stage inner cylinder;
    a first stage pick-off ring which has a cylindrical shape and extends from an inner peripheral edge which forms said circular hole on said first stage annular plate, and forms a flow path which passes through said circular hole;
    a main swirler including a hub disposed at an axial center thereof, a plurality of main swirl blades mounted radially around said hub; and
    an auxiliary swirler and having a plurality of auxiliary swirl blades mounted to said hub;
    wherein an outer edge of said main swirl blades is fixed to an inner wall of said diffuser or to an inner wall of a lower portion of said first stage inner cylinder, a main swirl flow path is formed in the space formed with said inner wall, said hub and said main swirl blades, each lower end of said plurality of auxiliary swirl blades is positioned lower than an upper end of said main swirl blades, an auxiliary swirl flow path is formed in the space along said plurality of auxiliary swirl blades formed of said hub and said plurality of auxiliary swirl blades, and an outer diameter of said auxiliary swirler is smaller than an outer diameter of said main swirler.

2. The steam separator according to claim 1,
    wherein a notch portion at the lower inner side of each of said main swirl blades is formed, and a number of said plurality of auxiliary swirl blades mounted to said hub is less in number than a number of said main swirl blades mountable to said hub.

3. The steam separator according to claim 1,
    wherein said hub is formed in a cylindrical configuration, a notch portion is formed at the inner side of each of said main swirl blade in the hollow of said hub, said auxiliary swirler is disposed in a space formed by said notch portion, and said plurality of auxiliary swirl blades and said main swirl blades are connected.

4. The steam separator according to claim 1, wherein an outer diameter of said auxiliary swirler is smaller than an inner diameter of said stand-pipe.

5. The steam separator according to claim 1,
    wherein a number of said plurality of auxiliary swirl blades is less than a number of said main swirl blades.

6. The steam separator according to claim 1, wherein incline slits are formed at an upper portion of said first stage inner cylinder.

7. The steam separator according to claim 1,
    wherein an opening is formed in said first stage annular plate, and a discharge pipe is provided to said first stage annular plate and stands upright in the opening toward an upper direction.

8. The steam separator according to claim 1,
wherein when said first stage outer cylinder has a length which also encloses said diffuser, and an outer diameter of said first stage outer cylinder at a lower portion which is positioned lower than said diffuser is smaller than an outer diameter of said first stage outer cylinder at an upper portion side which is positioned above said lower portion.

9. The steam separator according to claim 1, comprising:
an another stage inner cylinder for forming the flow path for the gas-liquid two-phase flow;
an another stage outer cylinder enclosing said another stage inner cylinder so as to be a concentric with a space between;
an another stage annular plate for sealing an inner peripheral edge of an upper end of said another stage outer cylinder and forming an another stage circular hole whose diameter is smaller than an inner diameter of said another stage inner cylinder; and
an another stage pick-off ring having a cylindrical portion which extends toward lower direction from said another stage circular hole and forming a flow path which passes through said another stage circular hole,
wherein a first stage steam separation section includes said diffuser, said first stage inner cylinder, said first stage outer cylinder, said first stage circular plate, said first stage pick-off ring, said main swirler and said auxiliary swirler,
an another stage steam separation section includes said another stage inner cylinder, said another stage annular plate, and said another stage pick-off ring,
and at least one stage of said another stage steam separation section is layered on said first stage steam separation section and connected to said first stage steam separation section as a flow path is formed.

10. A boiling water reactor comprising:
a reactor pressure vessel;
a core disposed in said reactor pressure vessel; and a plurality of steam separators according to claim 1 which is arranged above said core in said reactor pressure vessel.

11. A swirler assembly for being incorporated into a steam separator which separates gas-liquid two-phase flow into liquid and gas, comprising:
a cylinder;
a main swirler including a hub extending in an axial direction and disposed at an axial center thereof, a plurality of main swirl blades mounted radially around said hub at a same first axial position of said hub; and
an auxiliary swirler having a plurality of auxiliary swirl blades mounted to said hub at a same second axial position of said hub which is spaced from the first axial position;
wherein an outer edge of said main swirl blades is fixed to an inner wall of said cylinder, a main swirl flow path is formed in a space at least partially delimited by said main swirl blades and said inner wall, and said hub and said main swirl blades wherein each lower end of said plurality of auxiliary swirl blades mounted at the same second axial position is positioned lower in the axial direction of said hub than an upper end of each of said main swirl blades;
wherein an auxiliary swirl flow path is formed in a space along said plurality of auxiliary swirl blades at least partially delimited by said hub and said plurality of auxiliary swirl blades; and
wherein an outer diameter of said auxiliary swirler is smaller than an outer diameter of said main swirler.

12. The steam separator according to claim 1, wherein the first stage pick-off ring has the cylindrical shape which extends downwardly from the inner peripheral edge which forms said circular hole on said first stage annular plate.

13. The swirler assembly according to claim 11, wherein said cylinder has incline slits at an upper portion thereof.

* * * * *